(12) United States Patent
Trissel et al.

(10) Patent No.: US 8,988,648 B2
(45) Date of Patent: Mar. 24, 2015

(54) INTEGRATED IMAGE ERECTOR AND THROUGH-SIGHT INFORMATION DISPLAY FOR TELESCOPE OR OTHER OPTICAL DEVICE

(75) Inventors: Richard Trissel, Gualala, CA (US); Tony Maryfield, Poway, CA (US); Mahyar Dadkah, San Diego, CA (US); Michael Roes, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 628 days.

(21) Appl. No.: 13/225,644

(22) Filed: Sep. 6, 2011

(65) Prior Publication Data

US 2012/0224115 A1    Sep. 6, 2012

Related U.S. Application Data

(60) Provisional application No. 61/380,166, filed on Sep. 3, 2010.

(51) Int. Cl.
*G02F 1/13*     (2006.01)
*G02F 1/1335*   (2006.01)
*G02B 25/00*    (2006.01)

(52) U.S. Cl.
CPC ............ *G02F 1/1335* (2013.01); *G02B 25/001* (2013.01)
USPC .................................. 349/200; 349/11; 349/13

(58) Field of Classification Search
USPC ........................ 349/200, 11, 13–14
See application file for complete search history.

(56) References Cited

U.S. PATENT DOCUMENTS

| | | | |
|---|---|---|---|
| 6,377,409 B2 * | 4/2002 | Kanai | 359/834 |
| 7,269,920 B2 * | 9/2007 | Staley, III | 42/114 |
| 7,409,792 B2 * | 8/2008 | Narcy et al. | 42/120 |
| 8,336,776 B2 * | 12/2012 | Horvath et al. | 235/407 |
| 2009/0100735 A1 * | 4/2009 | Schick et al. | 42/123 |

* cited by examiner

*Primary Examiner* — Charles Chang
(74) *Attorney, Agent, or Firm* — Kilpatrick Townsend & Stockton LLP

(57) ABSTRACT

Techniques are disclosed for creating optical systems and devices that provide through-sight information while enabling the optical systems and devices to maintain a small, lightweight form factor. According to certain embodiments of the invention, an optical assembly can include a liquid-crystal display (LCD) disposed between the two prism elements of a Schmidt-Pechan prism at a focal plane of the optical assembly. This allows the LCD to be used to display information by blocking light passing through the optical assembly. Additionally, a light-emitting display, such as a backlit LCD, light-emitting diode (LED) display, or organic LED (OLED) display, can be coupled at a surface of one of the two prism elements of the Schmidt-Pechan prism to provide additional information in low-light environments.

20 Claims, 5 Drawing Sheets

INTEGRATED IMAGE ERECTOR AND THROUGH-SIGHT INFORMATION DISPLAY FOR TELESCOPE OR OTHER OPTICAL DEVICE

CROSS-REFERENCES TO RELATED APPLICATIONS

The present application claims benefit under 35 USC 119(e) of U.S. Provisional Application No. 61/380,166, filed on Sep. 3, 2010 of which the entire disclosure is incorporated herein by reference for all purposes.

BACKGROUND

In many optical devices information in addition to the image of the targeted object can be shown to a user looking into an eyepiece or viewfinder of the optical device. In the case of a laser rangefinder, for example, a distance to a target can be displayed along with an image of the target itself. Displaying both the information and the target, however, can present various technical challenges. Folding the optical path with a Schmidt-Pechan prism is one way to both shorten the optical device and also turn the image right-side up, but inserting additional information into the optical path traveling through the optical device can require additional optical elements into the optical path, such as a beam splitter, which can add to the size and weight of the optical device.

BRIEF SUMMARY

Techniques are disclosed for creating optical systems and devices that provide through-sight information while enabling the optical systems and devices to maintain a small, lightweight form factor. According to certain embodiments of the invention, an optical assembly can include a liquid-crystal display (LCD) disposed between the two prism elements of a Schmidt-Pechan prism at a focal plane of the optical assembly. This allows the LCD to be used to display information by blocking light passing through the optical assembly. Additionally, a light-emitting display, such as a backlit LCD, light-emitting diode (LED) display, or organic LED (OLED) display, can be coupled at a surface of one of the two prism elements of the Schmidt-Pechan prism to provide additional information in low-light environments.

An embodiment of an optical device configured to overlay information on an optical image, according to the disclosure, can include an objective lens and a Schmidt-Pechan prism having a first element and a second element. The first element of the Schmidt-Pechan prism can be configured to receive light entering the optical device through the objective lens and pass at least a portion of the light to the second element of the Schmidt-Pechan prism. The optical device further can include a liquid-crystal display (LCD) configured to block at least a portion of the light passing from the first element of the Schmidt-Pechan prism to the second element of the Schmidt-Pechan prism, and an eyepiece configured to receive light exiting the second element of the Schmidt-Pechan prism.

The optical device further can include one or more of the following features. A light-emitting display coupled to the second element of the Schmidt-Pechan prism such that the second element of the Schmidt-Pechan prism directs at least some light from the light-emitting display toward the eyepiece. The light-emitting display can include at least one of a light-emitting diode (LED) display an organic LED (OLED) display, or a backlit LCD. The LCD can be separated from the first element of the Schmidt-Pechan prism and the second element of the Schmidt-Pechan prism by a distance of at least 0.25 mm. A mirror coupled to a surface of the first element of the Schmidt-Pechan prism or the second element of the Schmidt-Pechan prism. A dichroic beam splitter coupled to a surface of the second element of the Schmidt-Pechan prism. A monochromatic display coupled to the dichroic beam splitter and configured to emit a certain color of visible light.

An embodiment of an image-erecting optical system for presenting through-sight information, according to the disclosure, can include an objective lens, and an erecting prism configured to receive light entering the optical system through the objective lens. The erecting prism can have a first element and a second element separated by a space. The optical system further can include a liquid-crystal display (LCD) disposed in the space between the first element of the erecting prism and the second element of the erecting prism such that at least a portion of light exiting the first element of the erecting prism passes through the LCD before entering the second element of the erecting prism, and an eyepiece configured to receive the light exiting the erecting prism.

The optical system further can include one or more of the following features. A light-emitting display coupled to a surface of the second element of the erecting prism. The LCD can be separated from the first element of the erecting prism and the second element of the erecting prism by a distance of at least 0.25 mm. The first element of the erecting prism and the second element of the erecting prism can have a refractive index of at least 1.6. A mirror coupled to a surface of the first element of the erecting prism or the second element of the erecting prism. The mirror can be partially transmissive. A dichroic beam splitter coupled to a surface of the second element of the erecting prism. A monochromatic display coupled to the dichroic beam splitter and configured to emit a certain color of visible light.

An embodiment of an image-erecting optical assembly configured to overlay information on an optical image, according to the disclosure, can include a first prism element configured to cause light entering a first surface of the first prism element to exit a second surface of the first prism element after reflecting off of a plurality of inner surfaces of the first prism element, and a second prism element disposed relative to the first prism element such that at least a portion of the light exiting the second surface of the first prism element enters a first surface of the second prism element. The second prism element can be configured to cause the light entering the first surface of the second prism element to exit a second surface of the second prism element after reflecting off of a plurality of surfaces internal to the second prism element. The optical assembly further can include a liquid-crystal display (LCD) configured to block at least a portion of the light exiting the second surface of the first prism element when the LCD is activated.

The optical assembly further can include one or more of the following features. A light-emitting display disposed relative to the second prism element such that at least some light from the light-emitting display enters a third surface of the second prism element and exits the second surface of the second prism element. The LCD can be separated from the first prism element and the second prism element by a distance of at least 0.25 mm. The first prism element and the second prism element can have a refractive index of at least 1.6. A mirror coupled to a surface of first prism element or second element prism element.

Numerous benefits are achieved by way of the present invention over conventional techniques. For example, embodiments of the present invention enable an optical device to use a Schmidt-Pechan prism (or other split-prism)

for image erection while providing additional through-sight information. This can allow for a smaller, cheaper, and/or lighter optical device. Additionally, because the LCD blocks the light passing through the optical device, it does not need to inject additional light into the system to be seen against the displayed image, saving on energy use and substantially increasing battery life for the optical device. Furthermore, a light-emitting display may be coupled with the Schmidt-Pechan prism at another location in the optical assembly, allowing for information to be seen on the displayed image of the optical device in low-light environments. These and other embodiments of the invention, along with many of its advantages and features, are described in more detail in conjunction with the text below and attached figures.

BRIEF DESCRIPTION OF THE DRAWINGS

For a more complete understanding of this invention, reference is now made to the following detailed description of the embodiments as illustrated in the accompanying drawing, in which like reference designations represent like features throughout the several views and wherein.

Figure 1:
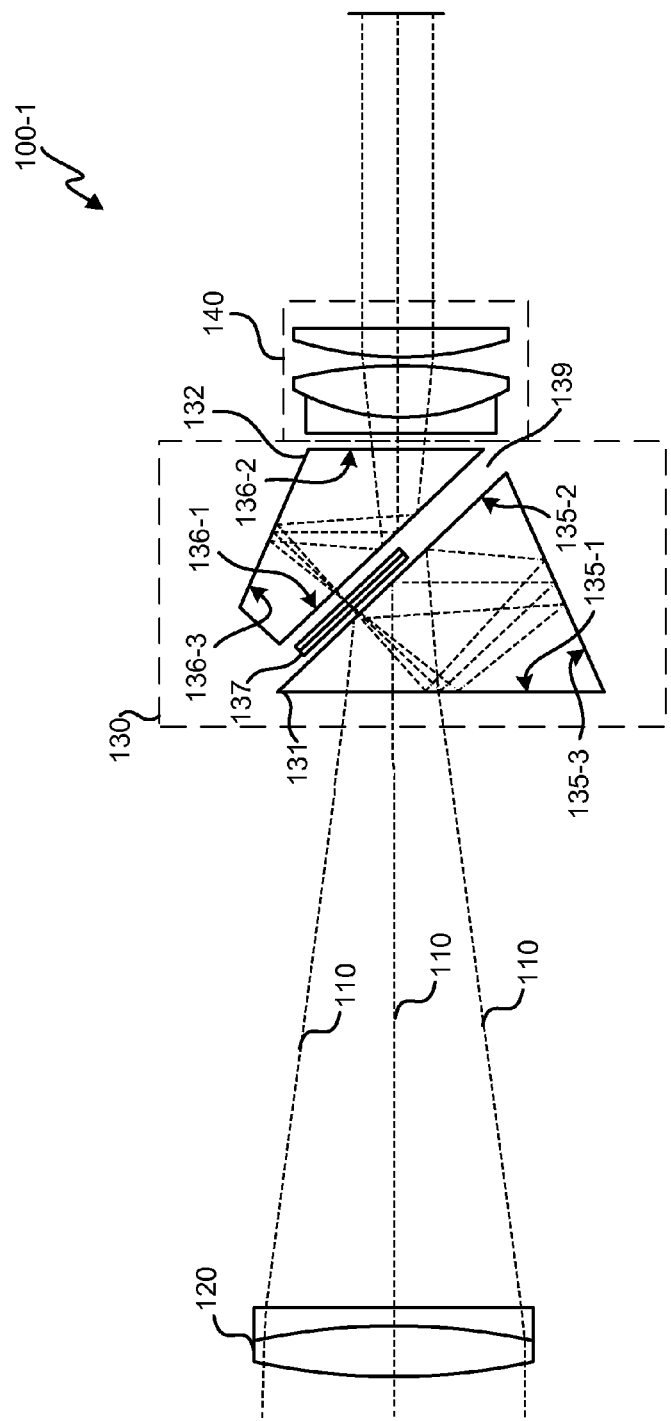
FIG. 1 is an image showing a simplified cross section of an optical system utilizing an LCD coupled with a Schmidt-Pechan prism, according to one embodiment of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION OF THE INVENTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the spirit and scope.

Modern optical devices can provide information in an image seen through an eyepiece of the optical devices. In addition to a target on which the optical device focused, for example, the optical device can display additional information through an eyepiece or viewfinder, such as information about the target, the environment, the optical device, and the like. Some optical devices provide the information separate from the image, such as below the image or in a blacked-out portion of the image. These optical devices can be easier to implement, but may be undesirable in many applications. It is undesirable in many military applications, for example, to black out portions of the display or cause the user to look away from the image in order to read the information.

Alternatively, information can be overlaid, or superimposed, onto the image. This, however, can present numerous additional technical issues. For example, overlaying information onto an image often requires additional optical components, such as beam splitters, that increase the optical path length, size, cost, and weight of an optical device.

Additionally, it can be difficult to overlay information bright enough to be visible by a viewer when overlaid on an image captured in a bright environment. Information is often provided by injecting light from a light-emitting display into the optical path of light travelling though the optical elements of an optical device. Because the brightness of the display has to compete with the brightness of the target, however, a display must emit a very large amount of light to be seen against, for example, a scene in bright sunlight. This can greatly reduce the battery life of an optical device, which is undesirable in most optical applications.

The use of a liquid-crystal display (LCD) coupled with a Schmidt-Pechan prism as provided herein, however, can enable information to be displayed on an image seen through an optical device, while maintaining a small form factor and providing information at a contrast level that is visible in almost any environment, including very bright environments. The features provided herein further enable this functionality while using very low amounts of battery power. Moreover, a second light-emitting display can be incorporated to allow an optical device to function in low-light environments, thereby enabling an optical device to accommodate the wide visual dynamic range requirements of a day/night optical system.

FIG. 1 is an image showing a simplified cross section of an optical system 100-1 utilizing an LCD coupled with a Schmidt-Pechan prism, according to one embodiment of the present invention.

Optical rays 110 can enter the optical system 100-1 through an objective lens 120. In various embodiments, the objective lens 120 can include a single lens, a compound lens, mirror, and/or a combination of several optical elements. Moreover, the objective lens 120 can have physical attributes, such as focal length, diameter, material composition, etc. to help provide the desired specifications of the optical system 100-1, such as a particular magnification and/or field of view. According to one embodiment, the objective lens has a clear aperture of 32 mm. Other embodiments can include larger or smaller apertures, depending on desired functionality. For example, embodiments can include aperture diameters of 25 mm or smaller, 35 mm, 38 mm, 50 mm, 63 mm, 80 mm, or 100 mm or larger.

After passing through the objective lens 120, optical rays 110 are guided toward an image erection assembly 130. The image erection assembly 130 is configured to erect, or rotate, the image captured by the optical system 100-1 for proper viewing through a series of reflections. The image erection assembly 130 can comprise a Schmidt-Pechan prism or similar split prism with a first prism element 131 and a second prism element 132. Advantages to using such an image erection assembly include not only rotating an image captured by the optical system 100-1 by 180 degrees for proper viewing without changing the handedness of the image, but also shortening of the overall length of the optical system 100-1 by folding the optical path within the prism elements 131, 132. Additional advantages include reducing overall weight and cost of the optical system 100-1.

Light from the objective lens 120 can enter the first prism element 131 at a first surface 135-1 a first surface of the first prism element 131. The light is then directed to a second surface 135-2 of the first prism element 131 after a series of reflections off of surfaces 135 internal to the first prism element 131, at which point the light exits. The reflections off the surfaces 135 internal to the first prism can be due to total internal reflection (TIR). To help ensure total internal reflection, the first prism element 131 can be made of any of a variety of materials with an index of refraction at visible wavelengths of approximately 1.6 or greater. N-F2 glass, obtainable from a number of vendors, is an example of a material from which the first prism element 131 can be made. Additionally or alternatively, for any reflections too shallow to be made efficiently through TIR, one or more of the surfaces 135 can incorporate a mirror and/or reflective coating. A third surface 135-3 of the first prism element 131, for example, may be coupled with a mirror and/or provided with a reflective coating to help increase the efficiency by which light reflects off of the third surface 135-3 of the first prism element 131.

At least a portion of the light exiting the second surface 135-2 of the first prism element 131 can then enter a first surface 136-1 of the second prism element 132. Similar to the first prism element 131, the light entering the second prism element 132 undergoes reflections off of surfaces 136-3 and 136-1 internal to the second prism element 132 before exiting the second prism element 132 at a second surface 136-2 of the second prism element 132. Also similar to the first prism element 131, reflections off the surfaces 136 internal to the second prism element 132 can be due to TIR, and the index of refraction of the second prism element 132 also can be approximately 1.6 or greater. Additionally or alternatively, one or more of the surfaces can incorporate a mirror and/or reflective coating. A third surface 136-3 of the second prism element 132, for example, may be coupled with a mirror and/or provided with a reflective coating to help increase the efficiency by which light reflects off of the third surface 136-3 of the second prism element 132. Furthermore, a light-emitting display can be coupled to the third surface 136-3 of the second prism element 132 as discussed in further detail below. In such embodiments, a mirror and/or reflective coating on the third surface 136-3 of the second prism element 132 can be at least partially transmissive.

The image erection assembly 130 also can include an LCD 137 or similar optical element configured to block at least a portion of the light exiting the second surface 135-2 of the first prism element 131 when the LCD 137 is activated. LCDs are low-cost, flat, and thin optical devices that can be activated to selectively block or allow light to pass by using a liquid crystal material. LCDs (and controlling microprocessors or other circuitry) also use very little power and can be easily customized to suit a variety of display applications. By selectively blocking light, the LCD 137 can display digits, text, graphs, pictures, and/or other information as either darkened or illuminated areas of the image captured by the optical system 100-1.

The LCD 137 can be located in a space 139 between the first prism element 131 and the second prism element 132 such that the LCD 137 can block at least a portion of the light exiting the first prism element 131 before it enters the second prism element 132. Moreover, as illustrated in FIG. 1, the focal power of the objective lens 120, the distance between the objective lens 120 and the image erection assembly 130, and other optical features can be configured such that the LCD 137 is located at a focal plane of the optical path. This allows both the image captured by the optical system 100-1 and the information provided on the LCD 137 to be in focus to a user.

The size and positioning of the LCD 137 can be important to the functionality of the optical system 100-1. For example, because both the first prism element 131 and the second prism element 132 utilize TIR on surfaces 135-2 and 136-1 near the LCD 137, and because the LCD 137 typically is encased in a glass or other optical material having a higher refractive index than air, the LCD 137 can be positioned such that there is a space between the LCD 137 and both of these surfaces 135-2 and 136-1 so as not to interfere with the TIR in the prism elements 131, 132. The distance between the LCD 137 and these surfaces 135-2 and 136-1 can vary, depending on desired functionality, manufacturing tolerances, and other concerns. According to one embodiment, the distance is approximately 0.25 mm or greater. Other embodiments can have distances smaller than 0.25 mm. Furthermore, distances much greater than 0.25 mm are also possible, although they may add an undesirable amount of length to the optical path and increase the size of the optical system 100-1. The LCD 137 also can be sized and positioned to cover the entire field of view of the image, enabling the information to be superimposed at any location on the image. According to some embodiments, an LCD 137 capable of performing over a large temperature range (e.g., −20 to 55 degrees Celsius) could be used for military applications. Speed, size, granularity, and other features of the LCD 137 also can be chosen to match the application.

Finally, after the light exits the second prism element 132, it passes through an eyepiece 140. Similar to the objective lens 120, the eyepiece 140 can include a single lens, a compound lens, mirror, and/or a combination of several optical elements. Additionally, the eyepiece 140 can have physical attributes, such as focal length, diameter, material composition, etc. to help provide the desired specifications of the optical system 100-1, such as a particular magnification and/or field of view.

The optical system 100-1, as shown in FIG. 1 includes many beneficial features. For one, it allows through-sight information to be presented to a user by overlaying the information on the image captured by the optical system 100-1 without the use of beam splitters and other components that would add to the complexity, size, and cost of the optical system 100-1. Additionally, by blocking the light from the image, rather than injecting light from a light-emitting display, information provided by LCD 137 can be seen over virtually any image captured by the optical system 100-1, including images captured in extremely bright environments. The use of an LCD 137 without requiring the display to be backlit or otherwise incorporate light-emitting technology also substantially lengthens the battery life of an optical device in utilizing the optical system 100-1.

Figure 2:
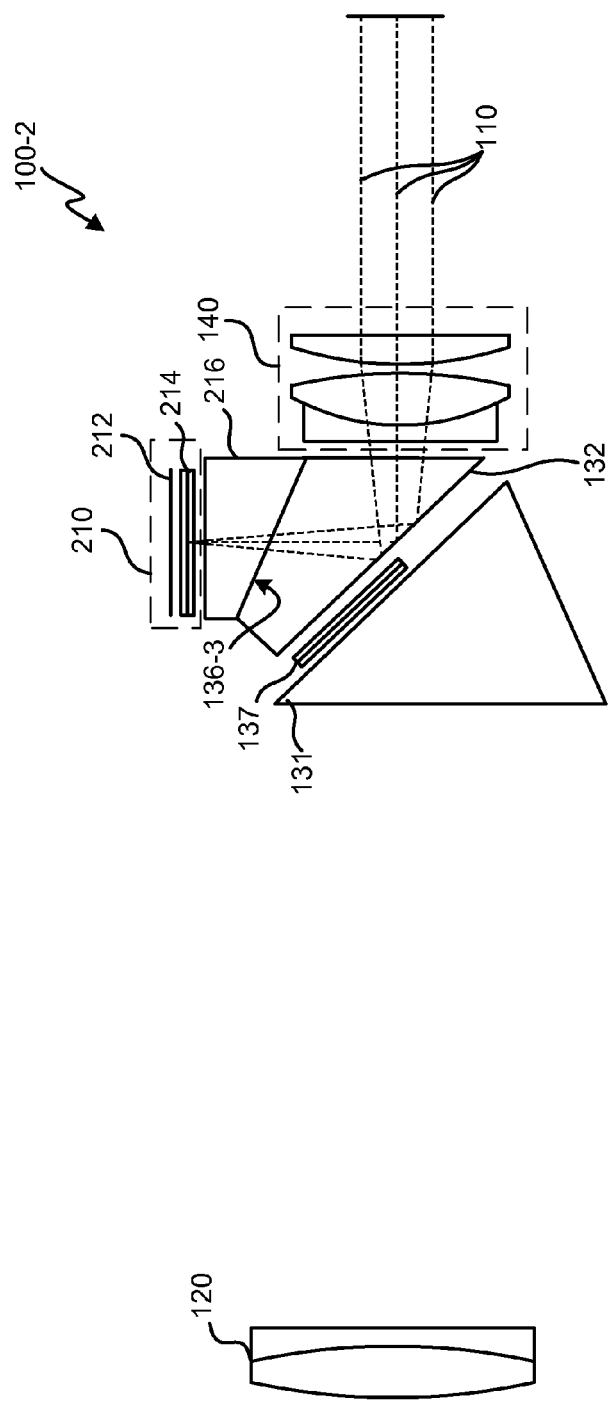
FIG. 2 is an image showing a simplified cross section of an optical system utilizing an additional light-emitting display coupled with a Schmidt-Pechan prism, according to another embodiment of the present invention.

FIG. 2 is an image showing a simplified cross section of an optical system 100-2 utilizing an additional light-emitting display coupled with a Schmidt-Pechan prism, according to one embodiment of the present invention. The optical system 100-2 of FIG. 2 is similar to the optical system 100-1 of FIG. 1. In addition, however, the optical system 100-2 of FIG. 2 has a light-emitting display 210 coupled to the second prism element 132 such that at least some optical rays 110 emitted from the light-emitting display are directed by the second prism element 132, through the eyepiece 140. Because the light-emitting display 210 can be located on a focal plane of the optical system 100-2, information shown on the light-emitting display 210 can be seen by a user. In one embodiment, the light-emitting display 210 is modular and can be removably attached to the optical system 100-2.

The light emitting display can utilize any of a variety of technologies. As shown in FIG. 2, the light-emitting display can comprise a backlit LCD having a backlight 212 located behind an LCD 214. Other types of light-emitting displays also can be used, such as light-emitting diode (LED) displays, organic LED (OLED) displays, and the like, depending on desired functionality, as well as manufacturing and cost considerations.

The light-emitting display 210 can be coupled to the second prism element 132 with a coupling element 216 such as glass. As indicated earlier, the introduction of the coupling element 216 can require the third surface 136-3 of the second prism element 132 (i.e., the surface to which the coupling element 216 is coupled) to include a mirror and/or reflective coating that is at least partially transmissive, thereby enabling the functionality described in relation to FIG. 1, in addition to allowing light from the light-emitting display 210 to be introduced into the optical path. Additionally or alternatively, coupling element 216 can include a dichroic beam splitter capable of selectively passing a small range of colors while reflecting other colors. Furthermore, the light-emitting display 210 can be a monochromatic or semi-monochromatic display configured to emit light within the range of colors passed by the dichroic beam splitter, thereby enabling the dichroic beam splitter to efficiently inject the light from the light-emitting display 210 into the optical path. Alternative embodiments, however, can utilize a full color light-emitting display 210.

With both the light-emitting display 210 and the LCD 137, the optical system 100-2 can accommodate the wide visual dynamic range requirements to operate at day and night. As discussed previously, the LCD 137 can block light from an optical image captured by the optical system 100-2 to show information distinguishable by a user in all but poorly-lit environments. However, in poorly-lit environments, including nighttime use, the light-emitting display 210 can be utilized to provide illuminated characters, graphics, and/or information overlaid against the image captured by the optical system 100-2. In fact, the light-emitting display 210 can even include images and/or video from a night-vision or other camera, in which case the night-vision images can be overlaid against the images captured by the optical system 100-2. Alternatively, the optical system 100-2 can be configured to show only images from the light-emitting display 210, while the image captured by the optical system is blocked by, for example, a cover covering the objective lens 120 or by the LCD 137 activated to block all light passing from the first prism element 131 to the second prism element 132.

Figure 3:
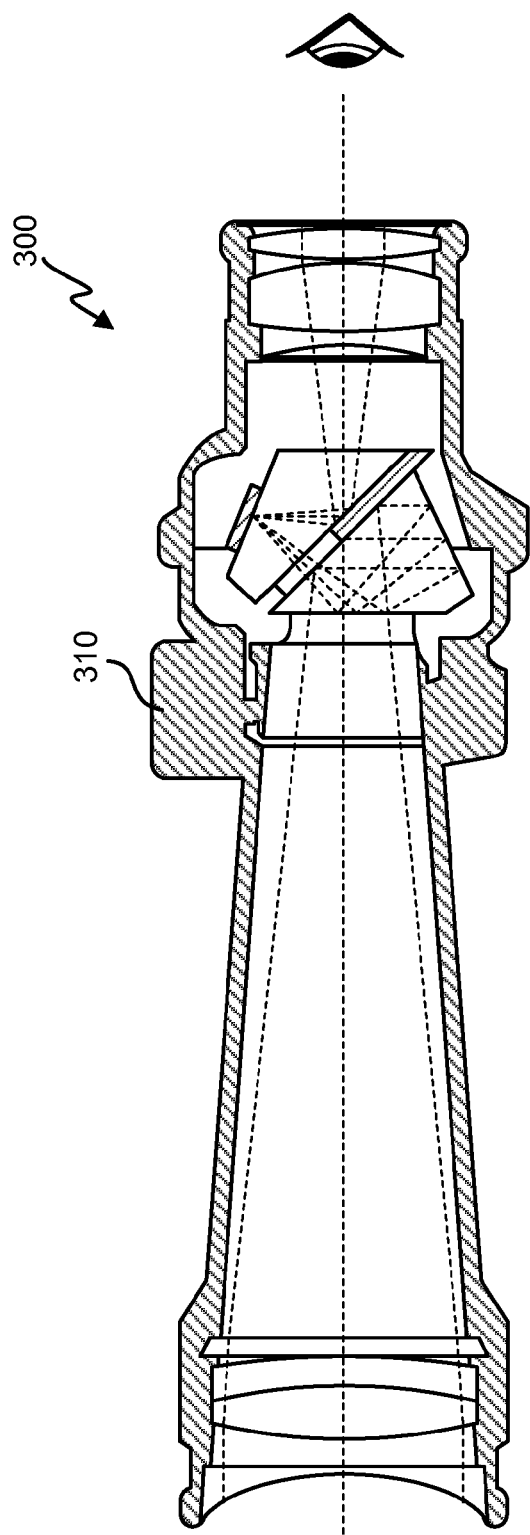
FIG. 3 is an image showing an embodiment of a simplified cross section of an optical device incorporating an embodiment of optical system provided herein into a body of the optical device.

FIG. 3 is an image showing an embodiment of a simplified cross section of an optical device 300 incorporating an optical system 100 as described herein into a body 310 of the optical device 300. The optical device 300 can take on a variety of shapes and forms, and include a variety of circuitry, processing devices, and other features, depending on desired functionality. In fact, the optical systems 100 herein can be incorporated into a wide range of optical devices 300, including but not limited to combat scopes, sniper scopes, telescopes, rangefinders, laser designators, and the like. Indeed, the virtually any optical device 300 where it is desirable to overlay information onto a direct view of an image can benefit from embodiments of the optical systems 100 provided herein. Moreover, depending on the application, the optical device 300 can be mounted to a variety of objects, such as to a weapon, a vehicle, a tripod, etc. The optical device 300 also can include mounting and calibration hardware (not shown) to enable the position and/or orientation of one or more components of the optical system 100 to be altered in order to calibrate the optical system 100 for increased accuracy. As described in more detail below, other components, such as sensors and/or communication devices, can be incorporated into the optical device 300 to provide information shown on the LCD 137, light-emitting display 210, or both.

Figure 4:
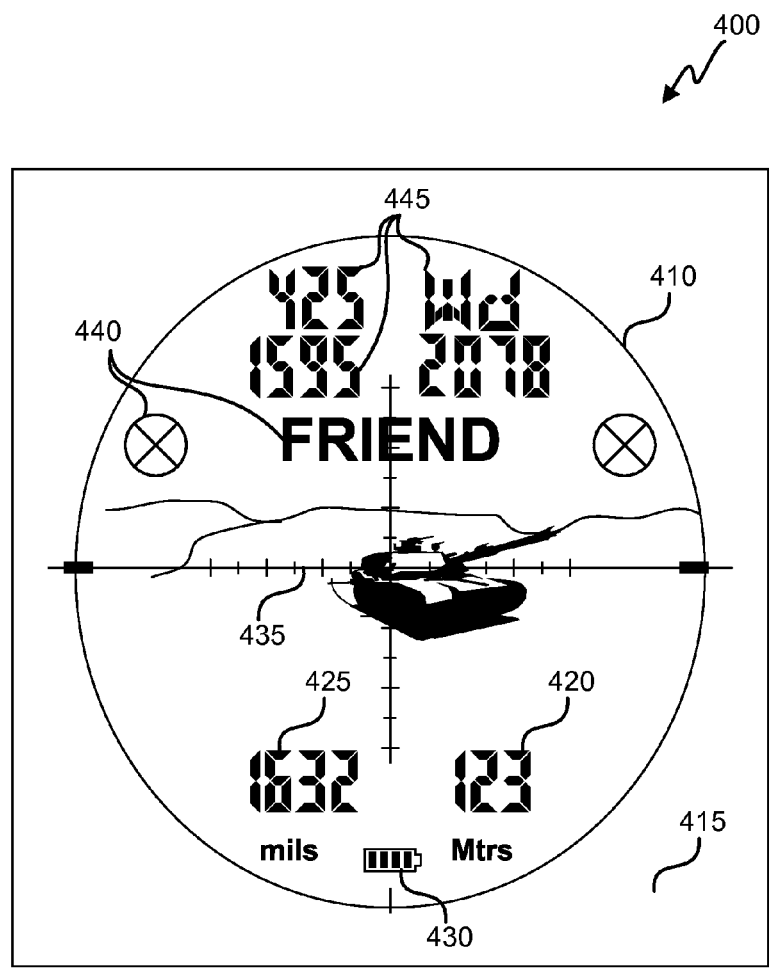
FIG. 4 is a simplified drawing of a view provided to a user looking through the eyepiece of an optical system described herein, according to one embodiment.

FIG. 4 is a simplified drawing of a view 400 to a user looking through the eyepiece 140 of an optical system 100 described herein, according to one embodiment. As described above, in addition to an image 410 captured by the optical system 100, additional information can be overlaid on the image 410. Additionally or alternatively, according to some embodiments, information can be provided in areas 415 next to the image 410.

The information provided to the user can include any of a variety of item, depending on the application and the functionality of the optical device 300. A weapon-mounted combat scope, for example, can include information and/or indicators regarding a range or distance to a target 420, a field of view 425, a battery-level 430, crosshairs 435, a friend-or-foe status 440, as well as additional information 445. Additional information can vary depending on application and desired functionality, but can include indicators of elevation, azimuth, altitude, bearing, elevation, bearing, position coordinates, horizon indicator, date, time, and the like.

In addition to this information, a light-emitting display 210 can provide images, which may be shown in the areas 415 next to the image 410, or while the image is obscured (e.g., by a lens cap or the LCD 137). The images provided by the light-emitting display 210 can include, for example, a live video feed from a camera coupled with the optical device 300. Alternatively, a video feed from a remote source can be communicated to the optical device 300 via a wireless, wired, and/or optical data connection. Furthermore, the images and/or video feed can be enhanced to show alternative light spectra (e.g., nightvision) and/or augmented reality information.

Figure 5:
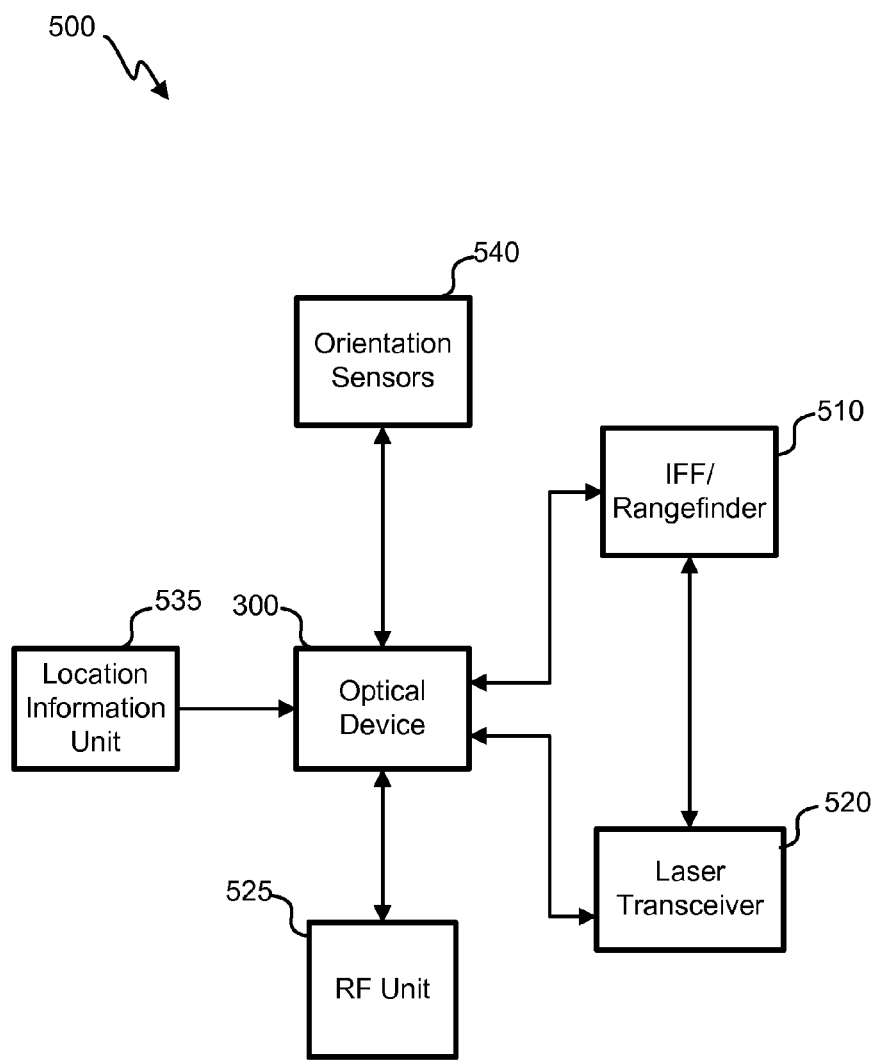
FIG. 5 is a block diagram of an embodiment of an optical device coupled with various information sources.

The various types of information shown to the user can come from a variety of information sources coupled with and/or incorporated into the optical device 300. Referring to FIG. 5, a block diagram 500 of an embodiment of an optical device 300 coupled with various such information sources for use in combat applications is shown. This embodiment incorporates the optical device 300 with an Identification, Friend or Foe (IFF)/rangefinder unit 510. According to this embodiment, the IFF/rangefinder unit 510 can utilize a laser transceiver 520 for determination of a friend-or-foe status by communicating with a target. It also can determine a distance to the target. The laser transceiver 520 may comprise a laser transmitter and one or more optical sensors for receiving optical transmissions. In some embodiments, the laser transmitter can use a laser that generates light having a wavelength of 1550 nanometers, but lasers generating other wavelengths, including 904 nm, also can be used. Additionally, a visible laser (e.g., red-spotting laser) can be integrated into the optical device 300, used for aiming a weapon to which the optical device 300 is mounted.

The present invention contemplates numerous ways of integrating the components shown in FIG. 5. One or more of the components can include hardware and/or software for communicating with other components to provide information to the optical device 300 which can process and/or relay the information to a user by overlaying the information on an image 410. With this understanding, one or more of the components shown in FIG. 5 may be physically and/or logically combined or separated without departing from the spirit of the disclosure provided herein.

The optical device 300 can be coupled to a radio frequency (RF) unit 525. The RF unit 525 can be a tactical radio communicatively coupled with a squad radio that can relay information to and from a central system, which can be provided to a user looking through the eyepiece 140 of the optical device 300. In either case, the information communicated via the RF unit 525 and/or the laser transceiver 520 can include weapon, range, identification, and other information.

A location information unit 535 and orientation sensors 540 also can be coupled to the optical device 300 to provide location, altitude, and orientation information. The location information unit 535 can include Global Positioning System (GPS), Global Navigation Satellite System (GNSS), and/or other location systems. The orientation sensors 540 can include a magnetic compass, celestial compass, inclinometer, accelerometer, and/or other systems to sense the azimuth, elevation, heading, and other orientation information regarding the optical device 300. Other sensors and components also can be communicatively coupled to the optical device 300.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation.

Computer programs incorporating various features of the present invention may be encoded on various computer readable storage media; suitable media include magnetic media, optical media, flash memory, and the like. Computer-readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download.

While the principles of the disclosure have been described above in connection with specific embodiments, it is to be clearly understood that this description is made only by way of example and not as limitation on the scope of the disclosure. Additional implementations and embodiments are contemplated. For example, the techniques described herein can be applied to various forms of optical devices, which may comprise a smaller portion of a larger optical system. Yet further implementations can fall under the spirit and scope of this disclosure.

What is claimed is:

1. An optical device configured to overlay information on an optical image, the optical device comprising:
   an objective lens;
   a Schmidt-Pechan prism having a first element and a second element, wherein the first element of the Schmidt-Pechan prism is configured to receive light entering the optical device through the objective lens and pass at least a portion of the light to the second element of the Schmidt-Pechan prism;
   a liquid-crystal display (LCD) configured to block at least a portion of the light passing from the first element of the Schmidt-Pechan prism to the second element of the Schmidt-Pechan prism; and
   an eyepiece configured to receive light exiting the second element of the Schmidt-Pechan prism.

2. The optical device configured to overlay information on the optical image recited in claim 1, further comprising a light-emitting display coupled to the second element of the Schmidt-Pechan prism such that the second element of the Schmidt-Pechan prism directs at least some light from the light-emitting display toward the eyepiece.

3. The optical device configured to overlay information on the optical image recited in claim 2, wherein the light-emitting display includes at least one of:
   a light-emitting diode (LED) display,
   an organic LED (OLED) display, or
   a backlit LCD.

4. The optical device configured to overlay information on the optical image recited in claim 1, wherein the LCD is separated from the first element of the Schmidt-Pechan prism and the second element of the Schmidt-Pechan prism by a distance of at least 0.25 mm.

5. The optical device configured to overlay information on the optical image recited in claim 1, further comprising a mirror coupled to a surface of the first element of the Schmidt-Pechan prism or the second element of the Schmidt-Pechan prism.

6. The optical device configured to overlay information on the optical image recited in claim 1, further comprising a dichroic beam splitter coupled to a surface of the second element of the Schmidt-Pechan prism.

7. The optical device configured to overlay information on the optical image recited in claim 6, further comprising a monochromatic display coupled to the dichroic beam splitter and configured to emit a certain color of visible light.

8. An image-erecting optical system for presenting through-sight information, the optical system comprising:
   an objective lens;
   an erecting prism configured to receive light entering the optical system through the objective lens, wherein the erecting prism has a first element and a second element separated by a space;
   a liquid-crystal display (LCD) disposed in the space between the first element of the erecting prism and the second element of the erecting prism such that at least a portion of light exiting the first element of the erecting prism passes through the LCD before entering the second element of the erecting prism; and
   an eyepiece configured to receive the light exiting the erecting prism.

9. The image-erecting optical system for presenting through-sight information recited in claim 8, further comprising a light-emitting display coupled to a surface of the second element of the erecting prism.

10. The image-erecting optical system for presenting through-sight information recited in claim 8, wherein the LCD is separated from the first element of the erecting prism and the second element of the erecting prism by a distance of at least 0.25 mm.

11. The image-erecting optical system for presenting through-sight information recited in claim 8, wherein the first element of the erecting prism and the second element of the erecting prism have a refractive index of at least 1.6.

12. The image-erecting optical system for presenting through-sight information recited in claim 8, further comprising a mirror coupled to a surface of the first element of the erecting prism or the second element of the erecting prism.

13. The image-erecting optical system for presenting through-sight information recited in claim 12, wherein the mirror is partially transmissive.

14. The image-erecting optical system for presenting through-sight information recited in claim 8, further comprising a dichroic beam splitter coupled to a surface of the second element of the erecting prism.

15. The image-erecting optical system for presenting through-sight information recited in claim 14, further comprising a monochromatic display coupled to the dichroic beam splitter and configured to emit a certain color of visible light.

16. A image-erecting optical assembly configured to overlay information on an optical image, the image-erecting optical assembly comprising:

a first prism element configured to cause light entering a first surface of the first prism element to exit a second surface of the first prism element after reflecting off of a plurality of inner surfaces of the first prism element;

a second prism element disposed relative to the first prism element such that at least a portion of the light exiting the second surface of the first prism element enters a first surface of the second prism element, wherein the second prism element is configured to cause the light entering the first surface of the second prism element to exit a second surface of the second prism element after reflecting off of a plurality of surfaces internal to the second prism element; and a liquid-crystal display (LCD) configured to block at least a portion of the light exiting the second surface of the first prism element when the LCD is activated.

17. The image-erecting optical assembly configured to overlay information on the optical image recited in claim 16, further comprising a light-emitting display disposed relative to the second prism element such that at least some light from the light-emitting display enters a third surface of the second prism element and exits the second surface of the second prism element.

18. The image-erecting optical assembly configured to overlay information on the optical image recited in claim 16, wherein the LCD is separated from the first prism element and the second prism element by a distance of at least 0.25 mm.

19. The image-erecting optical assembly configured to overlay information on the optical image recited in claim 16, wherein the first prism element and the second prism element have a refractive index of at least 1.6.

20. The image-erecting optical assembly configured to overlay information on the optical image recited in claim 16, further comprising a mirror coupled to a surface of first prism element or second element prism element.

* * * * *

UNITED STATES PATENT AND TRADEMARK OFFICE
CERTIFICATE OF CORRECTION

| | | |
|---|---|---|
| PATENT NO. | : 8,988,648 B2 | Page 1 of 1 |
| APPLICATION NO. | : 13/225644 | |
| DATED | : March 24, 2015 | |
| INVENTOR(S) | : Richard Trissel et al. | |

It is certified that error appears in the above-identified patent and that said Letters Patent is hereby corrected as shown below:

On the Title Page:

Column 1, Item 75 (Inventors:), line 3, please delete "Dadkah" and insert --Dadkhah--.

Signed and Sealed this
Second Day of August, 2016

Michelle K. Lee
*Director of the United States Patent and Trademark Office*